(12) United States Patent
Yu et al.

(10) Patent No.: US 12,474,878 B2
(45) Date of Patent: Nov. 18, 2025

(54) ELECTRONIC DEVICE AND APPLICATION DISPLAY METHOD AND MEDIUM THEREOF

(71) Applicant: Huawei Technologies Co., Ltd., Shenzhen (CN)

(72) Inventors: Yang Yu, Wuhan (CN); Xiong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/899,986

(22) Filed: Sep. 27, 2024

(65) Prior Publication Data
US 2025/0021287 A1    Jan. 16, 2025

Related U.S. Application Data

(63) Continuation of application No. PCT/CN2023/084710, filed on Mar. 29, 2023.

(30) Foreign Application Priority Data

Mar. 31, 2022  (CN) .......................... 202210344668.2

(51) Int. Cl.
  *G09G 5/00* (2006.01)
  *G06F 3/00* (2006.01)
  (Continued)

(52) U.S. Cl.
  CPC ............. *G06F 3/14* (2013.01); *G06F 9/451* (2018.02)

(58) Field of Classification Search
  CPC ........ G06F 3/14; G06F 9/451; G06F 9/45558; G06T 15/005
  See application file for complete search history.

(56) References Cited

U.S. PATENT DOCUMENTS

| | | | |
|---|---|---|---|
| 2005/0275661 A1* | 12/2005 | Cihula | G06F 21/55 345/619 |
| 2012/0081396 A1 | 4/2012 | Yusupov et al. | |

(Continued)

FOREIGN PATENT DOCUMENTS

| | | |
|---|---|---|
| CN | 106844066 A | 6/2017 |
| CN | 114040238 A | 2/2022 |

OTHER PUBLICATIONS

Hideyukn88 microsoft, "Enabling the Windows Subsystem for Linux to include support for Wayland and X server related scenarios. "[online]https://github.com/microsoft/wslg. Latest release on Apr. 4, 2024. total 7 pages.

*Primary Examiner* — Insa Sadio
(74) *Attorney, Agent, or Firm* — Slater Matsil, LLP

(57) ABSTRACT

This application relates to the field of operating systems, and relates to an electronic device and an application display method and a medium thereof. The application display method includes: A first system and a second system are run on the electronic device. The second system receives, from the first system, display data of a plurality of application windows and data identifiers of all the display data. The second system sends, based on window identifiers of the application windows corresponding to all the display data, all the display data to rendering tasks of the application windows corresponding to all the display data for rendering respectively, to obtain rendered images of all the display data. The second system displays, on a screen of the electronic device, the rendered images of all the display data on the application windows respectively corresponding to all the display data.

20 Claims, 11 Drawing Sheets

(51) Int. Cl.
  *G06F 3/14*     (2006.01)
  *G06F 9/451*    (2018.01)

(56) References Cited

U.S. PATENT DOCUMENTS

| | | |
|---|---|---|
| 2012/0084072 A1 | 4/2012 | Xue et al. |
| 2016/0232872 A1 | 8/2016 | Yoo et al. |
| 2017/0285955 A1* | 10/2017 | Carter .................... G06F 3/064 |
| 2020/0098081 A1 | 3/2020 | Li |

* cited by examiner

|  | First display periodicity | Second display periodicity | Third display periodicity |
|---|---|---|---|
| Linux side | Generate display data (f_id1) of a first image frame | Generate display data (f_id2) of a second image frame | Generate display data (f_id3) of a third image frame |
| Android side |  | Draw and display the first image frame (f_id1) | Draw and display the second image frame (f_id2) |

FIG. 3a

|  | First display periodicity | Second display periodicity | Third display periodicity | Fourth display periodicity |
|---|---|---|---|---|
| Linux side | Generate display data (f_id1) of a first image frame of a window 1 | Generate display data (f_id2) of a first image frame of a window 2 | Generate display data (f_id3) of a second image frame of the window 1 | Generate display data (f_id4) of a second image frame of the window 2 |
| Android side |  |  | Draw and display the first image frame (f_id1) of the window 1 | Draw and display the first image frame (f_id2) of the window 2 |

FIG. 3b

| | First display periodicity | Second display periodicity | Third display periodicity | Fourth display periodicity |
|---|---|---|---|---|
| Linux side | Generate display data (f_id1) of a first image frame of a window 1 (w_id1) Generate display data (f_id1) of a first image frame of a window 2 (w_id2) | Generate display data (f_id2) of a second image frame of the window 1 (w_id1) Generate display data (f_id2) of a second image frame of the window 2 (w_id2) | Generate display data (f_id3) of a third image frame of the window 2 (w_id2) | Generate display data (f_id3) of a third image frame of the window 1 (w_id1) Generate display data (f_id4) of a fourth image frame of the window 2 (w_id2) |
| Android side | | Draw and display the first image frame (f_id1) of the window 1 (w_id1) Draw and display the first image frame (f_id1) of the window 2 (w_id2) | Draw and display the second image frame (f_id2) of the window 2 (w_id2) | Draw and display the second image frame (f_id2) of the window 1 (w_id1) Draw and display the third image frame (f_id3) of the window 2 (w_id2) |

FIG. 3c

ELECTRONIC DEVICE AND APPLICATION DISPLAY METHOD AND MEDIUM THEREOF

CROSS-REFERENCE TO RELATED APPLICATIONS

This application is a continuation of International Application No. PCT/CN2023/084710, filed on Mar. 29, 2023, which claims priority to Chinese Patent Application No. 202210344668.2, filed on Mar. 31, 2022. The disclosures of the aforementioned applications are hereby incorporated by reference in their entireties.

TECHNICAL FIELD

This application relates to a virtualization technology in the field of operating systems. In particular, this application relates to an electronic device and an application display method and a medium thereof.

BACKGROUND

In the technical field of Linux-Android dual-system fusion, an electronic device may use the Android system as a primary system, and use the Linux system as a secondary system. For example, on an electronic device on which the Android system is installed, the Linux system is run in a manner of virtualization (virtual machine or container), and a user may start an application on a Linux side and display an application window on a screen of the electronic device. In this case, the window of the application installed on the Linux side needs to be rendered by using a system service (rendering service) on an Android side, and is displayed on the screen of the electronic device.

In the foregoing technical solution, when a plurality of applications on the Linux side are run, windows of the plurality of applications are generated. Display data of these windows needs to be sent from the Linux side to the Android side, and the application windows are rendered by using the rendering service on the Android side and displayed. The rendering service on the Android side can simultaneously perform rendering processing on display data that is of a window of one application and that is sent by the Linux side. In other words, when the Android side performs rendering processing on the display data of the window of the one application, display data that is of another window and that is generated by the Linux side needs to wait in a queue. When there are a large quantity of application windows on the Linux side and display data of some windows is large, a high delay is generated in a process of rendering an application window with large display data by the Android side. This blocks rendering of a window of another Linux-side application by the Android side, and causes a delay in displaying the window of the another Linux-side application, which degrades user experience.

SUMMARY

An objective of this application is to provide an electronic device and an application display method and a medium thereof.

A first aspect of this application provides an application display method. The application display method is applied to an electronic device. A first system and a second system are run on the electronic device.

The method includes the following.

The second system receives, from the first system, display data of a plurality of application windows and data identifiers of all the display data. A first data identifier of first display data includes a window identifier identifying an application window to which the first display data belongs. The first data identifier of the first display data is a data identifier of any piece of display data among the data identifiers of all the display data.

The second system sends, based on window identifiers corresponding to all the display data, all the display data to rendering tasks of the application windows corresponding to all the display data for rendering respectively, to obtain rendered images of all the display data.

The second system displays, on a screen of the electronic device, the obtained rendered images of all the display data on the application windows respectively corresponding to all the display data.

That is, in this embodiment of this application, the electronic device herein may be an intelligent device such as a mobile phone or a tablet computer. The first system may be a Linux system. The second system may be an Android system. The second system is a primary system run in the electronic device. The first system is a secondary system run in the second system. In other words, the first system may be run in the second system of the electronic device by using a virtual machine or a container. The plurality of application windows herein may be a plurality of application windows corresponding to one application run in the first system or a plurality of application windows corresponding to a plurality of applications. The data identifier herein may include a window identifier and a data identifier. The window identifier may be a window number of an application window corresponding to display data and the data identifier may be a frame number corresponding to the display data. A window identifier corresponding to each application window is unique. Frame numbers corresponding to the display data of all the application windows may be independent of each other. Display data of an application window may be uniquely determined by using the window identifier in combination with the data identifier. The rendering task herein may be a window processing thread that may be created by the second system based on a window identifier of each piece of display data, and is used to render (in other words, perform display processing on or draw) the display data into display content of the application window. The rendering tasks corresponding to all the application windows may be run independently and simultaneously. The second system displays, on the screen of the electronic device, display content of an application window whose rendering is completed.

According to the method in this embodiment of this application, in a scenario in which a plurality of applications and the plurality of windows are started in the first system, the first system may send the display data of all the windows to the second system for rendering and display, and the first system may simultaneously receive and process response messages of the windows, so that display frame rates of the windows of the first system are independent of each other. Even if display data of one window is large, and rendering processing performed by the second system on the window is slow, this only causes frame freezing of images in the window, but does not affect a display frame rate of another window, which improves user experience.

In a possible implementation of the first aspect, the first data identifier further includes a display data sequence number. The display data sequence number indicates a rendering sequence of the first display data in a plurality of pieces of display data of a same application window.

In other words, in this embodiment of this application, the display data sequence number herein is a value of the data identifier (value of the frame number). The value of the data identifier is incremental. A rendering sequence of the display data may be determined by using display data sequence numbers, to ensure contiguity of the display data of the application window of the first system.

In a possible implementation of the first aspect, the plurality of application windows include a first application window, and the first display data is display data of the first application window.

The method further includes the following.

After completing rendering the first display data, the second system returns a first response message and the first data identifier of the first display data to the first system.

The first system selects the display data of the first application window from the generated display data based on a first window identifier in the received first response message and first data identifier, and selects, from the selected display data of the first application window based on a first display data sequence number in the first data identifier, second display data that needs to be rendered after the first display data.

The first system sends the second display data and a second data identifier of the second display data to the second system. The second data identifier includes the first window identifier and a second display data sequence number.

In other words, in this embodiment of this application, the first display data and the second display data herein may be display data that is of the first application window and that is generated by the first system in sequence. The first display data and the second display data may be distinguished by using the first display data sequence number and the first display data sequence number. For example, a window identifier of the first application window may be w_id, and the first display data sequence number and the first display data sequence number of the corresponding first display data and second display data may be f_id=1 and f_id=2 respectively. The first display data sequence number and the first display data sequence number herein are incremental in sequence, and indicate that the first display data and the second display data are generated by the first system in sequence. The first response message may correspond to the first data identifier of the first display data, and is used by the first system to determine the first display data that has been sent and whose rendering is completed.

In a possible implementation of the first aspect, the rendering task is a thread task created by the second system, and each application window corresponds to one rendering task.

In other words, in this embodiment of this application, the rendering task herein may be a processing thread corresponding to a display service of the first system, and the rendering task may correspond to the window identifier of the application window. For example, each rendering task may be uniquely identified by using a window identifier (window number w_id) of an application window.

In a possible implementation of the first aspect, the plurality of application windows further include a second application window, and the display data of the plurality of application windows further includes third display data of the second application window.

A data amount of the first display data is different from a data amount of the third display data. Time for which the second system renders the first display data is different from time for which the second system renders the third display data.

That is, in this embodiment of this application, the second application window and the first application window herein may be windows of a same application, or may be windows of different applications. That a data amount of the first display data is different from a data amount of the third display data herein may mean that the third display data is larger than the second display data. Therefore, the time for which the second system renders the third display data is longer than the time for which the second system renders the first display data.

In a possible implementation of the first aspect, on the screen of the electronic device, a display frame rate of a rendered image of the first application window is different from a display frame rate of a rendered image of the second application window, and the display frame rate indicates a quantity of rendered images refreshed by the application window per unit time.

That is, in this embodiment of this application, because the time for which the second system renders the third display data is longer than the time for which the second system renders the first display data, on the screen of the electronic device, the display frame rate of the rendered image of the second application window is less than the display frame rate of the rendered image of the first application window. In other words, display content of the second application window is delayed.

In a possible implementation of the first aspect, the first system includes a Linux system, the second system includes an Android system, the second system is a primary system run on the electronic device, and the first system is a secondary system run in the second system.

In a possible implementation of the first aspect, the plurality of application windows include windows of a same application or different applications in the first system.

In other words, in this embodiment of this application, the first application window and the second application window may be windows of a same application or different applications run in the first system.

A second aspect of this application provides an electronic device. The electronic device includes: a processor; and a memory, where the memory may be coupled to or decoupled from the processor, and is configured to store instructions executed by the processor; and when the instructions are executed by the processor, the electronic device performs the method provided in the first aspect.

A third aspect of this application provides a computer-readable storage medium. The computer-readable storage medium includes instructions. When the instructions are executed by an electronic device, the electronic device is enabled to implement the method provided in the first aspect.

BRIEF DESCRIPTION OF THE DRAWINGS

FIG. 3a, FIG. 3b, and FIG. 3c are diagrams of generating display data of a rendering application on a Linux side and an Android side of an electronic device according to an embodiment of this application;

DETAILED DESCRIPTION OF ILLUSTRATIVE EMBODIMENTS

Embodiments of this application include but are not limited to an electronic device and an application display method and a medium thereof. To make the objectives, technical solutions, and advantages of this application clearer, the following further describes the implementations of this application in detail with reference to the accompanying drawings.

As described above, in a current Linux-Android dual-system fusion technology, a high delay is generated in a process of rendering an application window with large display data by an Android side. This blocks rendering of a window of another Linux-side application by the Android side, and causes a delay in displaying the window of the another Linux-side application.

It may be understood that the rendering herein may include: A Linux side sends display data of an application window to the Android side. The Android side performs display processing on the display data after obtaining the display data of the application window from the Linux side, in other words, draws the display data to generate display content of the application window. The rendering process may also be referred to as a display process.

Figure 1:
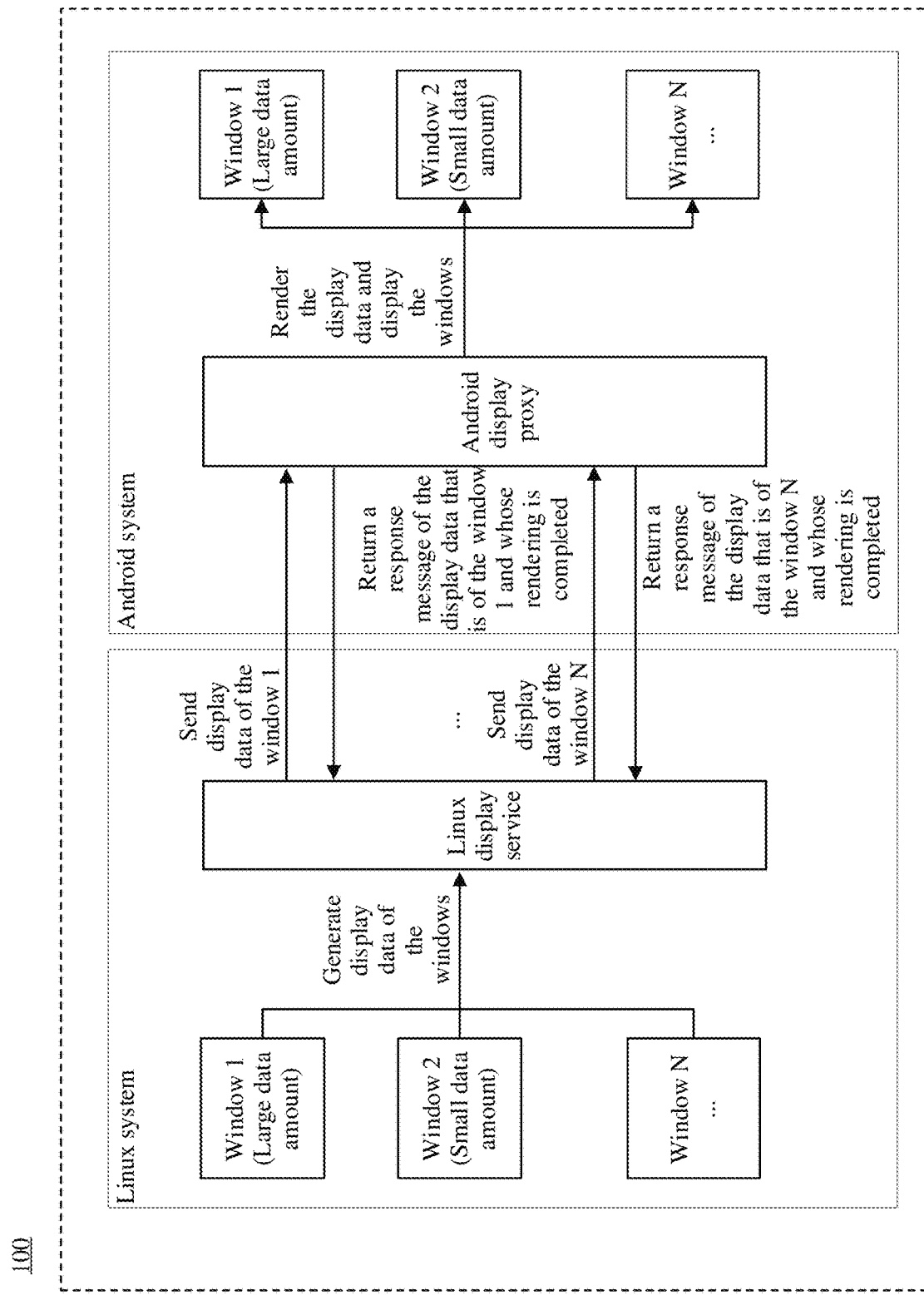
FIG. 1 is a diagram of a scenario in which an electronic device displays an application window according to an embodiment of this application.

For example, FIG. 1 is a diagram of a scenario in which an electronic device displays an application window. Specifically, a primary system of the electronic device 100 herein is an Android system. The electronic device 100 displays, on a screen of the electronic device 100, a window of an application that is of a Linux system and that is run on the Android system. In the scenario shown in FIG. 1, a Linux side generates windows of a plurality of applications (for example, a window 1 to a window N in FIG. 1). For a window that is of an application and that is generated by the Linux side, for example, the window 1, in correspondence to a change of display content of the application, the Linux side generates, in correspondence to each change, a group of display data. After receiving each group of display data, the Android system correspondingly renders each group of display data into a frame of image and displays the frame of image in the window 1 of the application. That is, if the Linux side generates new display data of the application, after receiving the new display data, the Android system renders the new display data to a corresponding image, and then updates the display content in the window 1 to a latest rendered image.

The Linux side may send display data of one of the windows to an Android display proxy on an Android side by using a Linux display service. The Android display proxy may send the display data of the window to a rendering service on the Android side, and the rendering service may render the display data of the window and perform display. After the rendering service on the Android side completes rendering, the Android display proxy may return, to the Linux side, a response message about rendering completion. After the Linux side receives the response message, the Linux side may continue to send display data of a next window to the Android display proxy on the Android side by using the Linux display service. The Linux display service and the Android display proxy herein may be software modules run on the Linux side and the Android side.

It may be understood that, in some embodiments, the Linux side does not distinguish between application windows corresponding to display data, and sends the display data to the Android side in sequence only based on a generation sequence of the display data. For example, if display data 1 corresponding to the window 1 is generated in a first display periodicity, the display data 1 is sent. If display data 2 corresponding to a window 3 is generated in a second display periodicity, the display data 2 is sent. In this way, the rendering service on the Android side can also receive only one group of display data at a time, and perform, in a same display periodicity, rendering processing on only one group of display data sent by the Linux side, but cannot simultaneously process a plurality of groups of display data of the windows of the plurality of applications in parallel.

It may be understood that, when the Linux side sends the display data of the application window to the Android side, a frame number (frame_id, referred to as f_id for short in the following) corresponding to a group of display data is generated and sent at the same time. The frame number is used to uniquely identify the display data. When the Linux side receives, from the Android side, the response message of the display data whose rendering is completed, the Linux side also receives the frame number corresponding to the display data, so that the Linux side can determine that rendering of a previous group of display data that is of the application window and that has been sent is completed, and a next group of display data of the application window may then be sent to the Android side. Herein, a value of the frame number is incremental, to ensure contiguity of the display data that is of the application window and that is sent by the Linux side. However, the frame number only corresponds to the display data, and the application windows corresponding to the display data are not distinguished.

Figure 2:
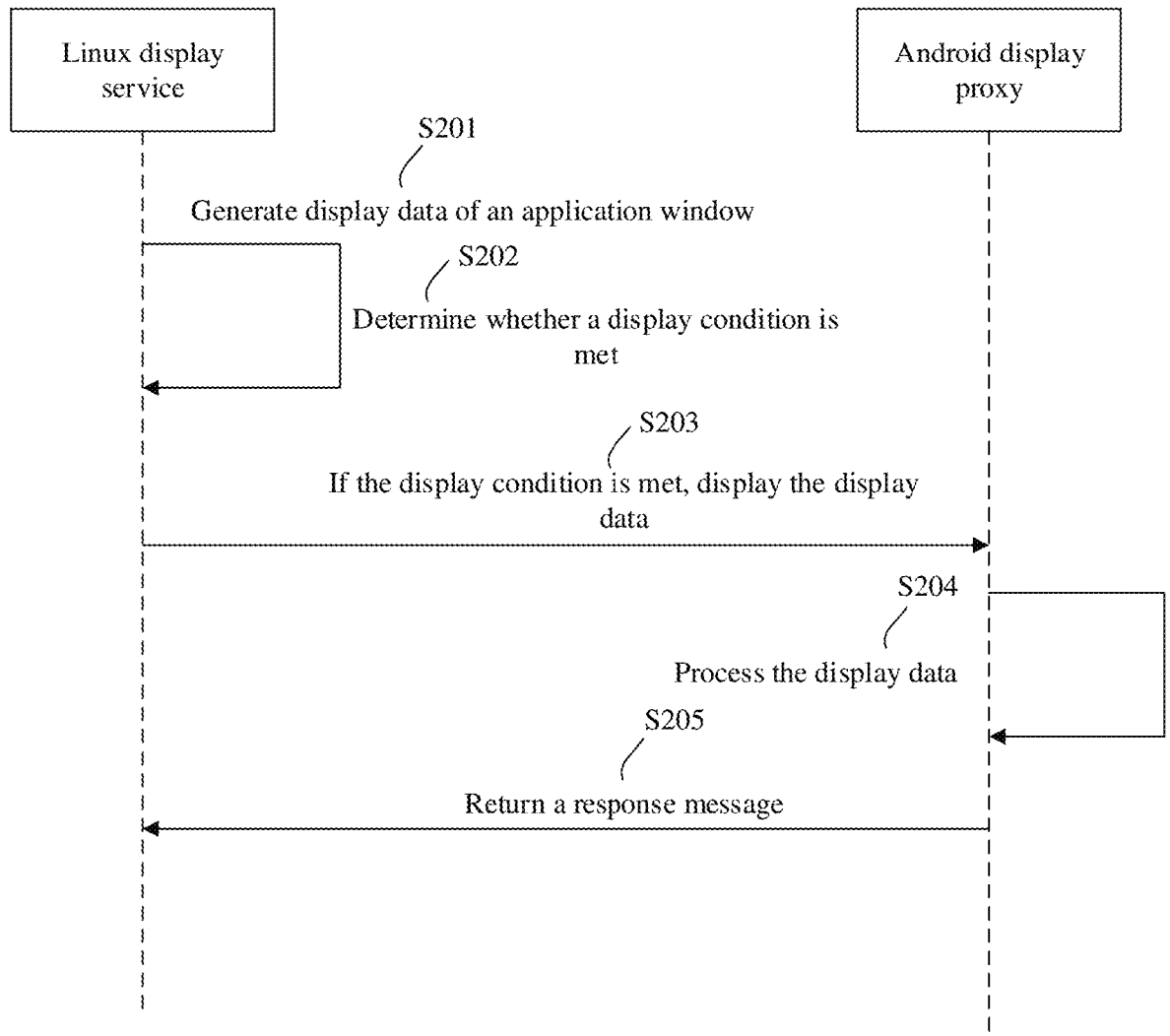
FIG. 2 is a schematic flowchart of transmitting display data of an application window between a Linux display service and an Android display proxy of an electronic device according to an embodiment of this application.

The following describes, by using FIG. 2, the diagram of the scenario shown in FIG. 1. FIG. 2 is a schematic flowchart of transmitting display data of an application window between a Linux display service and an Android display proxy of an electronic device. Specifically, a procedure shown in FIG. 2 includes the following steps.

S201: A Linux side generates the display data of the application window.

The display data herein may be a text, an image, and various components (such as a button, an input box, and a drop-down box) in the application window on the Linux side of the electronic device 100.

S202: The Linux display service determines whether a display condition is met.

If the Linux display service determines that the display condition is met, step S203 is performed. If the display condition is not met, step S202 continues to be performed, and the Linux display service waits until the display condition is met.

For example, the display condition herein may include: The display data of the application window on the Linux side changes, a primary system (Android system) of the electronic device 100 reaches a next display periodicity, and a rendering service on the Android system has completed rendering display data that is of an application window and that is sent last time.

It may be understood that the display periodicity may be represented by a screen refresh rate (FPS) of the electronic device 100, namely, a quantity of times the screen updates an image per second. For example, refresh frequency of the screen of the electronic device 100 is 30 frames per second, and the screen of the electronic device 100 refreshes the application window on the screen once every 33 milliseconds (1000/30=33). In other words, the electronic device 100 may obtain the display data of the application window once every 33 milliseconds, render the display data into an image frame, and display the image frame on the screen. In other words, the display periodicity may be represented as a process from obtaining, from the Linux side by an Android side of the electronic device 100, the display data of the application window to completing, based on the display data by the Android side, rendering the application window and performing display.

S203: The Linux display service displays the display data.

For example, as shown in FIG. 3a, in a first display periodicity, the Linux side of the electronic device 100 may generate display data of a first image frame in the application window; and in a second display periodicity, the Linux side sends the display data of the first image frame to the Android side. That is, after obtaining the display data of the application window on the Linux side, the Linux display service sends the display data to the Android display proxy on the Android side.

When obtaining the display data of the first image frame, the Linux display service herein may set a frame number (f_id) of the first image frame for the display data of the first image frame, and may further send the frame number (f_id) of the first image frame at the same time when sending the display data of the first image frame to the Android display proxy. The frame number herein uniquely identifies the display data that is of the application window and that is sent by the Linux side to the Android side, namely, a frame number that uniquely identifies an image frame corresponding to display data that is currently being rendered by the rendering service on the Android side. One group of display data may correspond to one current frame number.

After receiving the display data of the application window on the Linux side, the Android display proxy sends the display data to the rendering service on the Android side.

S204: The rendering service on the Android side processes the display data.

The rendering service on the Android side completes rendering the first image frame of the application window on the Linux side based on the display data of the first image frame, and displays the first image frame.

It may be understood that the rendering service on the Android side may render the display data in sequence based on the received display data to generate an image frame. In other words, the rendering service on the Android side can simultaneously perform rendering processing on display data of only one image frame sent by the Linux side.

S205: After the rendering service on the Android side completes processing the display data, the Android display proxy returns a response message.

After the rendering service on the Android side completes rendering the first image frame of the application window and performs display, in other words, in the second display periodicity, the Android display proxy returns the response message of the rendering service on the Android side to the Linux side by using the Linux display service. When returning the response message to the Linux side by using the Linux display service, the Android display proxy may return, to the Linux side, the frame number (f_id1) of the first image frame whose rendering is completed, to notify the Linux side that rendering of the first image frame of the application window on the Linux side has been completed and the first image frame of the application window is displayed.

Still refer to FIG. 3a. It may be understood that the Linux side may further continue to generate display data of a second image frame of the application window in the second display periodicity. By analogy, after the Linux side receives the response message from the Android side and the frame number (f_id1) of the first image frame of the application window, in a third display periodicity, after the Linux side confirms that the response message from the Android side and the frame number of the first image frame are received, the Linux side may send, to the Android side, the display data of the second image frame of the application window and a frame number (f_id2) of the second image frame, the Android side may render and display the second image frame of the application window, and at the same time, the Linux side may generate display data of a third image frame (f_id3) of the application window. It can be learned that values of the frame numbers of the image frames herein may be incremental in sequence. In other words, the Linux side needs to wait until rendering of display data of a previous image frame is completed by the Android side, and then sends display data of a next image frame to the Android side.

It may be understood that the frame numbers that are of the image frames and that are incremental in sequence herein may also indicate a rendering sequence for rendering the image frames by the Android side. In other words, the Android side renders the first image frame (f_id1), the second image frame (f_id2), and the third image frame (f_id3) in sequence.

In this embodiment of this application, if display data that is of an image frame of the application window and that is sent by the Linux side is large, the rendering service on the Android side cannot complete rendering the display data of the application window and perform display in a display periodicity, and the Linux side cannot receive, in time, a response message of the sent display data of the application window and a frame number corresponding to the display data. In other words, even if the Linux side generates display data of a next image frame of the application window, the Linux side cannot send the display data of the next image frame to the Android side in a next display periodicity. In this case, a display frame rate of the application window on the screen of the electronic device 100 is reduced, and frame freezing occurs on the application window.

For example, as shown in FIG. 3b, an application 1 and an application 2 are started on the Linux side, and the application 1 and the application 2 respectively correspond to a window 1 and a window 2. In the first display periodicity, the Linux side of the electronic device 100 may generate display data of a first image frame of the window 1. In the second display periodicity, the Linux side sends the display data of the first image frame of the window 1 and a frame number (f_id1) of the display data to the Android side, and at the same time, the Linux side generates display data (f_id2) of a first image frame of the window 2. Still refer to FIG. 3b. Because the display data of the first image frame of the window 1 is large, the rendering service on the Android side does not complete rendering the first image frame of the application window 1 and returns a response message and the frame number (f_id1) to the Linux side by using the Linux display service until the third display periodicity. As a result, the display data of the first image frame of the window 2 generated by the Linux side can be sent to the Android side only in a fourth display periodicity for rendering and display. Therefore, display data (f_id3) of a second image frame of the window 1 and display data (f_id4) of a second image frame of the window 2 that are generated by the Linux side also need to wait for the Android side to complete rendering the display data (f_id2) of the first image frame of the window 2. In other words, even if the Linux side generates the display data of the first image frame of the window 2 in the second display periodicity, the Linux side cannot send, in the third display periodicity, the display data of the first image frame of the window 2 to the Android side for rendering and display. In other words, display frame rates of both the window 1 and the window 2 on the screen of the electronic device 100 are reduced, and consequently, frame freezing occurs in display content of both the window 1 and the window 2.

It can be learned that, if a plurality of applications are started on the Linux side, and windows of the plurality of applications are displayed on the screen of the electronic device 100, display data of the windows of the plurality of applications is generated on the Linux side, and the Linux side also sets a frame number for an image frame corresponding to each group of display data. Values of frame numbers of image frames corresponding to the display data of the windows of the plurality of applications are also incremental in sequence. When the Linux side sends display data of a window of one of the applications to the Android side for rendering, the Linux side also needs to wait until the Android side completes processing the sent display data of the application window, and then sends display data of a next window to the Android side.

If display data of a window of one of the applications is large, processing time of display data that is of a window of the application and that is sent each time is long. In addition to causing frame freezing of images in the window of the application, the Android side cannot send display data of a window of another application to the Linux side in time. This affects processing of the display data of the window of the another application by the Android side. Finally, display frame rates of windows of all applications started on the Linux side are reduced, and consequently, frame freezing of images occurs in the windows of all the applications on the screen of the electronic device 100.

An embodiment of this application provides an application display method of an electronic device, to resolve a problem that in an electronic device having Linux and Android dual systems, when a plurality of applications are started on a Linux side and there is excessive display data of a window of one of the applications, a delay is consequently generated when an Android side processes the display data of the window of the application, and frame freezing of images consequently occurs in windows of all applications on a screen of the electronic device. Specifically, the application display method provided in this embodiment of this application includes the following steps.

A window number (window_id, referred to as w_id for short in the following) identifying each window is set for each window of the application started on the Linux side, and a frame number (f_id) is set for display data of each window generated each time. The window number corresponding to each window is unique. The window number and the frame number are combined to distinguish between application windows corresponding to display data, and frame numbers corresponding to display data of all windows may be independent of each other. In this way, the Linux side may simultaneously send, to the Android side, the display data of the windows of the plurality of applications, the frame numbers of the display data, and window numbers of the display data. After the Android side receives the display data of the windows of the plurality of applications, the Android side may create a corresponding rendering task (processing thread) for each window. Each rendering task is identified by a window number (w_id). A plurality of rendering tasks may simultaneously invoke a rendering service on the Android side to render the display data of each window and display display content of a rendered window on the screen of the electronic device. It may be understood that display content of each window herein is not necessarily displayed simultaneously. The display content of each window may be synchronously displayed or asynchronously displayed. A display sequence of display content of a plurality of windows is not limited in this embodiment. After each rendering task on the Android side completes rendering display data of a window corresponding to the rendering task, the Android side may simultaneously return a response message, the window number, and the frame number to the Linux side, so that the Linux side may continue to simultaneously send, to the Android side, updated display data (a next piece of display data that is of the window and that is generated by the Linux side) of each window whose rendering has been completed.

For example, as shown in FIG. 3c, an application 1 and an application 2 are started on the Linux side, and the application 1 and the application 2 respectively correspond to a window 1 (w_id1) and a window 2 (w_id2). In a first display periodicity, the Linux side of the electronic device 100 may generate display data of a first image frame of the window 1 and display data of a first image frame of the window 2. In a second display periodicity, the Linux side may send the display data, the window number (w_id1), and a frame number (f_id1) of the display data of the first image frame of the window 1 and the display data, the window number (w_id2), and a frame number (f_id1) of the display data of the first image frame of the window 2 to the Android side. At the same time, the Linux side generates display data of a second image frame of the window 1 and display data of a second image frame of the window 2. The Android side may create two rendering tasks to simultaneously render the display data of the second image frame of the window 1 and the display data of the second image frame of the window 2.

Still refer to FIG. 3c. Because the display data of the first image frame of the window 1 is large, the rendering service on the Android side does not complete rendering the first image frame of the application window 1 until a third display periodicity, and replies to the Linux side. In addition, in the second display periodicity and the third display periodicity, the rendering service on the Android side separately completes rendering the display data of the first image frame of the window 2 and the display data of the second image frame of the window 2, and replies to the Linux side. In a fourth display periodicity, the rendering service on the Android side separately completes rendering the display data of the second image frame of the window 1 and display data of a third image frame of the window 2, and replies to the Linux side.

It can be seen that, in a time period from the second display periodicity to the third display periodicity, a display frame rate of the window 1 is reduced, and frame freezing occurs in display content of the window 1, but the window 2 may consistently maintain normal display.

According to the application display method in this embodiment of this application, in a scenario in which the plurality of applications and the plurality of windows are started on the Linux side, the Linux side may simultaneously send the display data of all the windows to the Android side for rendering and display, and the Linux side may simultaneously receive and process response messages of the windows, so that display frame rates of the windows on the Linux side are independent of each other. Even if display data of one window is large, and rendering processing performed by the Android side on the window is slow, this only causes frame freezing of images in the window, but does not affect a display frame rate of another window, which improves user experience.

Figure 4:
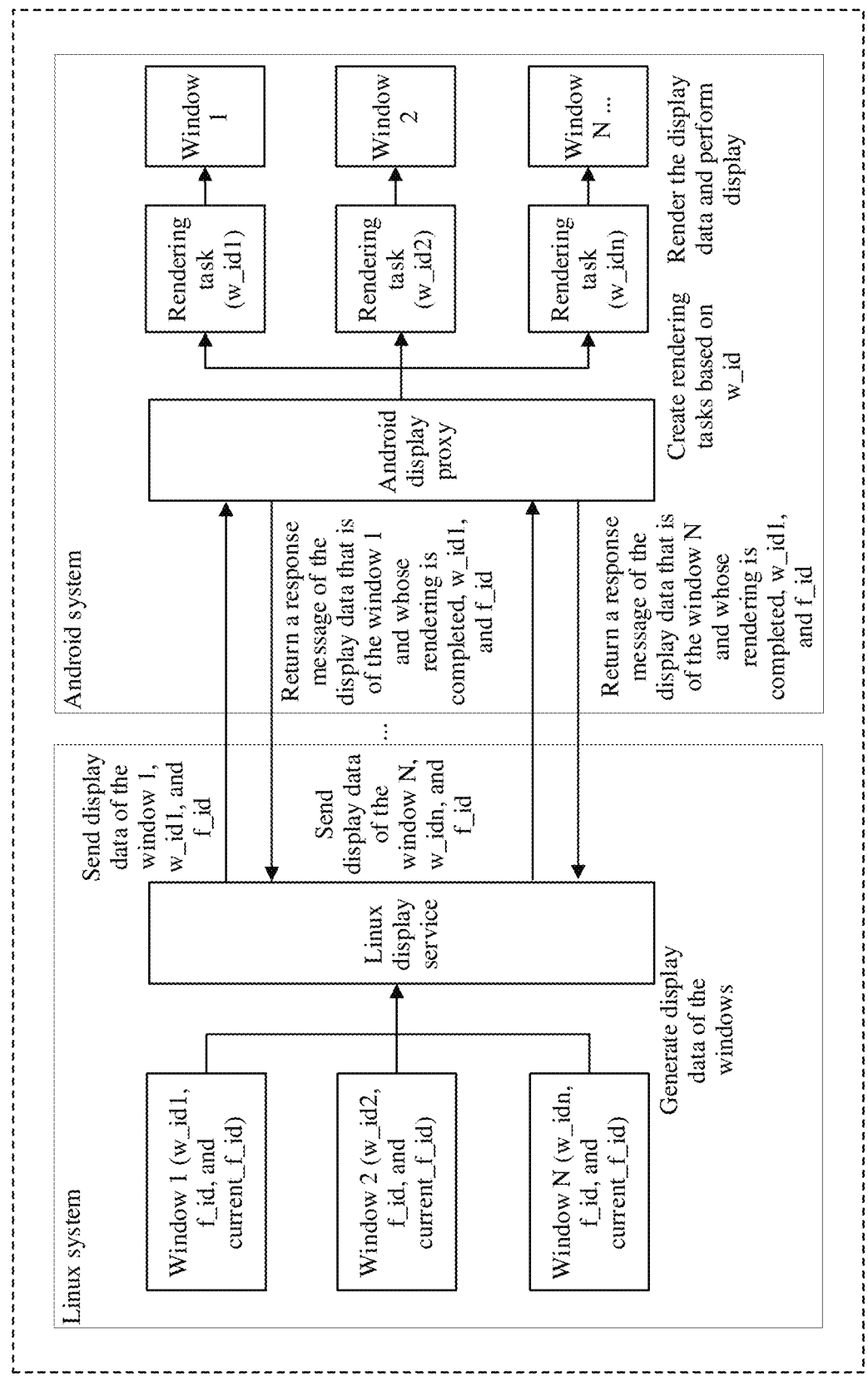
FIG. 4 is a diagram of a scenario of an application display method of an electronic device according to an embodiment of this application.

FIG. 4 is a diagram of a scenario of an application display method of an electronic device according to an embodiment of this application. A primary system of the electronic device 100 in FIG. 4 is an Android system. The electronic device 100 displays, on a screen of the electronic device, an application window that is of a Linux system and that is run on the Android system. In the scenario shown in FIG. 4, a Linux side generates display data of windows (a window 1 to a window N) of a plurality of applications. The Linux side may further set identification information such as a window number (w_id), a returned frame number (rsp_f_id), and a current frame number (current_f_id) for a window and display data of each application. For example, an application window 1 in FIG. 4 is used as an example. A frame number of display data that is of the application window 1 and that has been sent by the Linux side to an Android side is current_f_id=1, and a window number is w_id1. After sending, a frame number of a next group of display data that is of the application window 1 and that is continuously generated by the Linux side is current_f_id=2, in other words, a current frame number (current_f_id) is current_f_id=2. The current frame number herein identifies the display data that is of the application window 1 and that is currently generated by the Linux side. Each time display data of the application window 1 is generated by the Linux side, a current frame number may be set for the display data, and values of current frame numbers may be incremental in sequence. The returned frame number is used to store a frame number of display data whose rendering has been completed and that is returned to the Linux side when the Android side returns a response message to the Linux side. The Linux side may determine whether a difference between the current frame number and the returned frame number is 1 to determine that display data that is of the application window and that is sent by the Linux side to the Android side is contiguous, so as to ensure that no frame loss occurs in the application window.

It may be understood that the frame numbers that are incremental in sequence herein may also indicate a rendering sequence for rendering image frames by the Android side. In other words, the Android side renders the display data (current_f_id=1) of the window 1 and display data (current_f_id=2) of a window 2 in sequence.

The Linux side may simultaneously send, to an Android display proxy (hsl-shell app module) on the Android side by using a Linux display service (hsl-weston module), display data of a plurality of windows and window numbers (w_id) and current frame numbers (current_f_id) corresponding to the display data of the windows. A transmission connection for transmitting the display data and the identification information may be established between the Linux display service and the Android display proxy. The Android display proxy may create a rendering task (for example, a window processing thread in FIG. 4) for each window. The rendering task corresponding to each window may be uniquely identified by using a window number (w_id) of the window. In addition, the Android side may store the received current frame number (current_f_id) of the display data as a frame number (f_id) corresponding to the display data. The Android side may distinguish, by using the window number in combination with the frame number (w_id+f_id) between display data that is of an application window and that is being processed by the Android side. The Android display proxy sends the display data of the window to a rendering task corresponding to the window on the Android side. The rendering task may invoke a rendering service on the Android side to render the display data of the window and perform display. After the rendering service on the Android side completes rendering, the Android display proxy may return, to the Linux side, the response message about rendering completion and a window number (w_id) and a frame number (f_id) of an application window whose rendering is completed. After receiving the response message, the window number (w_id), and the frame number (f_id), the Linux side may determine the corresponding application window by using the Linux display service based on the returned window number (w_id), and stores, as the returned frame number (rsp_f_id), the frame number (f_id) that is returned. The Linux side determines, based on the returned frame number (rsp_f_id), a next group of display data corresponding to the application window, and continues to send the next group of display data to the Android display proxy on the Android side. For example, the application window 1 is still used as an example. The window number received by the Linux side is w_id1, and the frame number is f_id=1. The Linux side stores the frame number as a returned frame number rsp_f_id=1. The Linux side determines, by using w_id1, that the application window is the window 1, and calculates that a difference between the returned frame number rsp_f_id=1 and the current frame number current_f_id=2 of the window 1 is 1. In this case, the Linux side determines that display data that is of the application window 1 and that is sent by the Linux side to the Android side is contiguous. It may be understood that the Linux side may continue to send, to the Android side, the display data that is of the application window 1 and whose current frame number is current_f_id=2, and the Linux side may generate display data that is of the application window 1 and whose current frame number is current_f_id=3. It may be understood that display content of each of the window 1 to the window N herein is not necessarily displayed simultaneously. The display content of each of the window 1 to the window N may be displayed synchronously or asynchronously. A display sequence of the display content of each of the window 1 to the window N is not limited in this embodiment.

It may be understood that the electronic device in embodiments of this application is a terminal device having a display function. For example, a common terminal device may include a vehicle-mounted device, a mobile phone, a tablet computer, a notebook computer, a palmtop computer, a mobile Internet device (MID), a wearable device (for example, a smart watch, a smart band, or a pedometer), a personal digital assistant, a portable media player, a navigation device, a video game device, a set-top box, a virtual reality and/or augmented reality device, an Internet of Things device, an industrial control device, a streaming media client device, an e-book, a reading device, and other devices.

Figure 5:
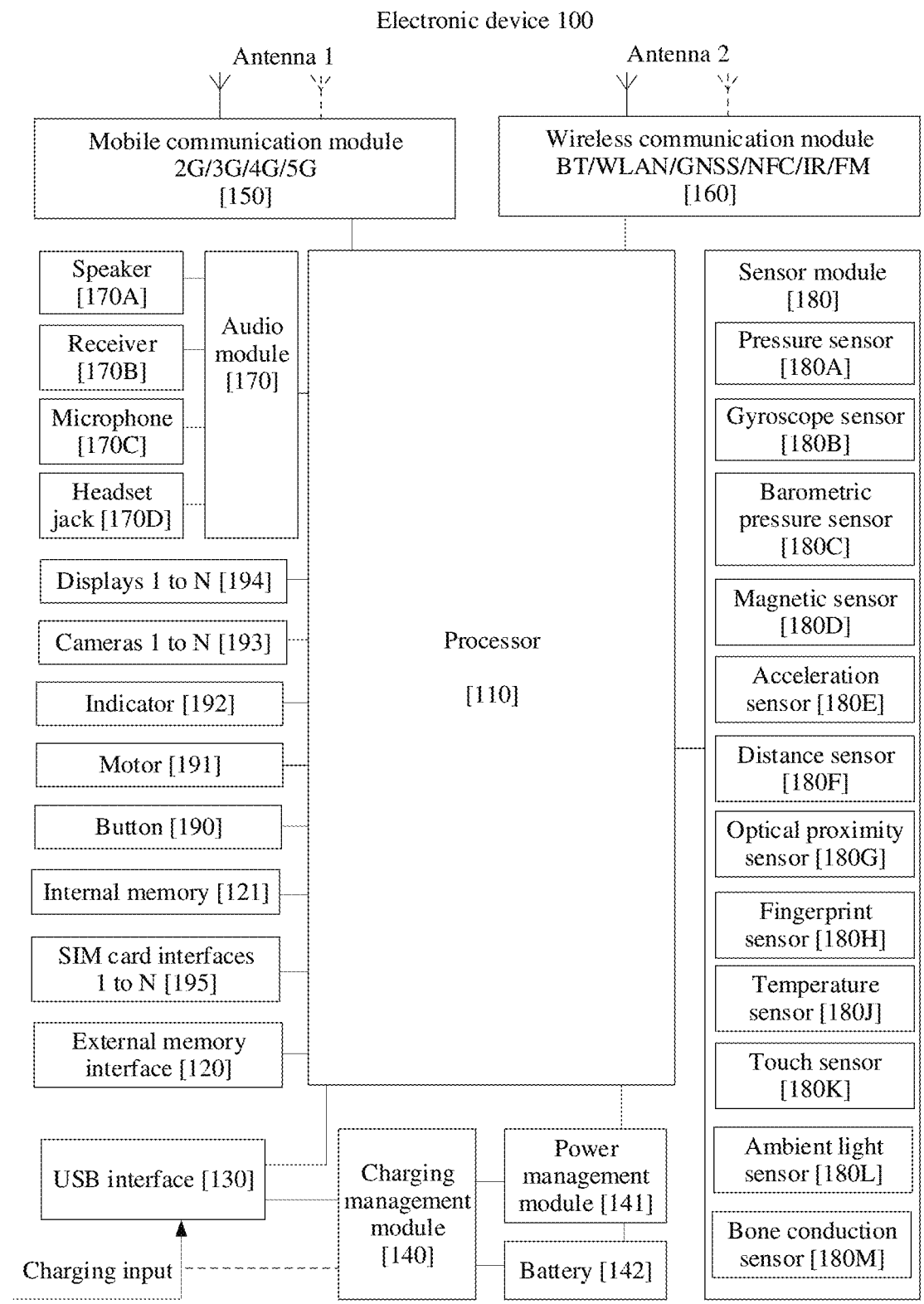
FIG. 5 is a diagram of a hardware structure of an electronic device according to an embodiment of this application.

FIG. 5 is a diagram of a structure of the electronic device 100 according to an embodiment of this application. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented in hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor (BP), and/or a neural network processing unit (NPU). Different processing units may be independent devices, or may be integrated into one or more processors.

The memory may be further disposed in the processor 110, and is configured to store instructions and data. In some embodiments, the memory in the processor 110 is a cache. The memory may store instructions or data that has been used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

The charging management module 140 is configured to receive a charging input from a charger. The charger may be a wireless charger or a wired charger. In some wired charging embodiments, the charging management module 140 may receive a charging input from the wired charger through the USB interface 130.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as battery capacity, a battery cycle quantity, and a state of health (leakage and impedance) of the battery.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may further be multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a solution that is applied to the electronic device 100 and that is to wireless communication including 2G, 3G, 4G, 5G, and the like.

The wireless communication module 160 may provide a solution that is applied to the electronic device 100 and that is to wireless communication including a wireless local area network (WLAN) (for example, a wireless fidelity (Wi-Fi) network), Bluetooth (BT), a global navigation satellite system (global navigation satellite system, GNSS), frequency modulation (FM), a near field communication (NFC) technology, an infrared (IR) technology, and the like.

The electronic device 100 may implement a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. In some embodiments, the electronic device 100 may include one or N displays 194. N is a positive integer greater than 1.

The electronic device 100 may implement a photographing function through the camera 193, the ISP, the video codec, the GPU, the display 194, the application processor, and the like.

The camera 193 is configured to capture a still image or a video. In some embodiments, the electronic device 100 may include one or N cameras 193. N is a positive integer greater than 1.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer executable program code. The executable program code includes instructions. The internal memory 121 may include a program storage region and a data storage region. The processor 110 runs the instructions stored in the internal memory 121 and/or the instructions stored in the memory disposed in the processor, to perform various function applications and data processing of the electronic device 100.

The electronic device 100 may implement an audio function, for example, music play and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. Music may be listened to, or a hands-free call may be answered through the electronic device 100 through the speaker 170A.

The receiver 170B, also referred to as an "earpiece", is configured to convert an audio electrical signal into a sound signal. When a call is answered or voice information is received through the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound by moving a human mouth close to the microphone 170C, to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile electronic device platform (OMTP) standard interface or cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed on the display 194.

The gyroscope sensor 180B may be configured to determine a motion posture of the electronic device 100.

The barometric pressure sensor 180C is configured to measure barometric pressure. In some embodiments, the electronic device 100 calculates an altitude by using a barometric pressure value measured by the barometric pressure sensor 180C to assist in positioning and navigation.

The magnetic sensor 180D includes a Hall sensor.

The acceleration sensor 180E may detect accelerations in various directions (usually on three axes) of the electronic device 100.

The distance sensor 180F is configured to measure a distance.

The optical proximity sensor 180G may include, for example, a light-emitting diode (LED) and an optical detector.

The ambient light sensor 180L is configured to sense ambient light luminance.

The fingerprint sensor 180H is configured to collect a fingerprint.

The temperature sensor 180J is configured to detect a temperature.

The touch sensor 180K is also referred to as a "touch device". The touch sensor 180K may be disposed on the display 194, and the touch sensor 180K and the display 194 form a touchscreen, which is also referred to as a "touch screen".

The bone conduction sensor 180M may obtain a vibration signal.

The button 190 includes a power button, a volume button, and the like. The button 190 may be a mechanical button, or may be a touch button. The electronic device 100 may receive a button input, and generate a button signal input related to user setting and function control of the electronic device 100.

The motor 191 may generate a vibration alert. The motor 191 may be configured to provide an incoming call vibration alert or a touch vibration feedback.

The indicator 192 may be an indicator, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100.

Figure 6:
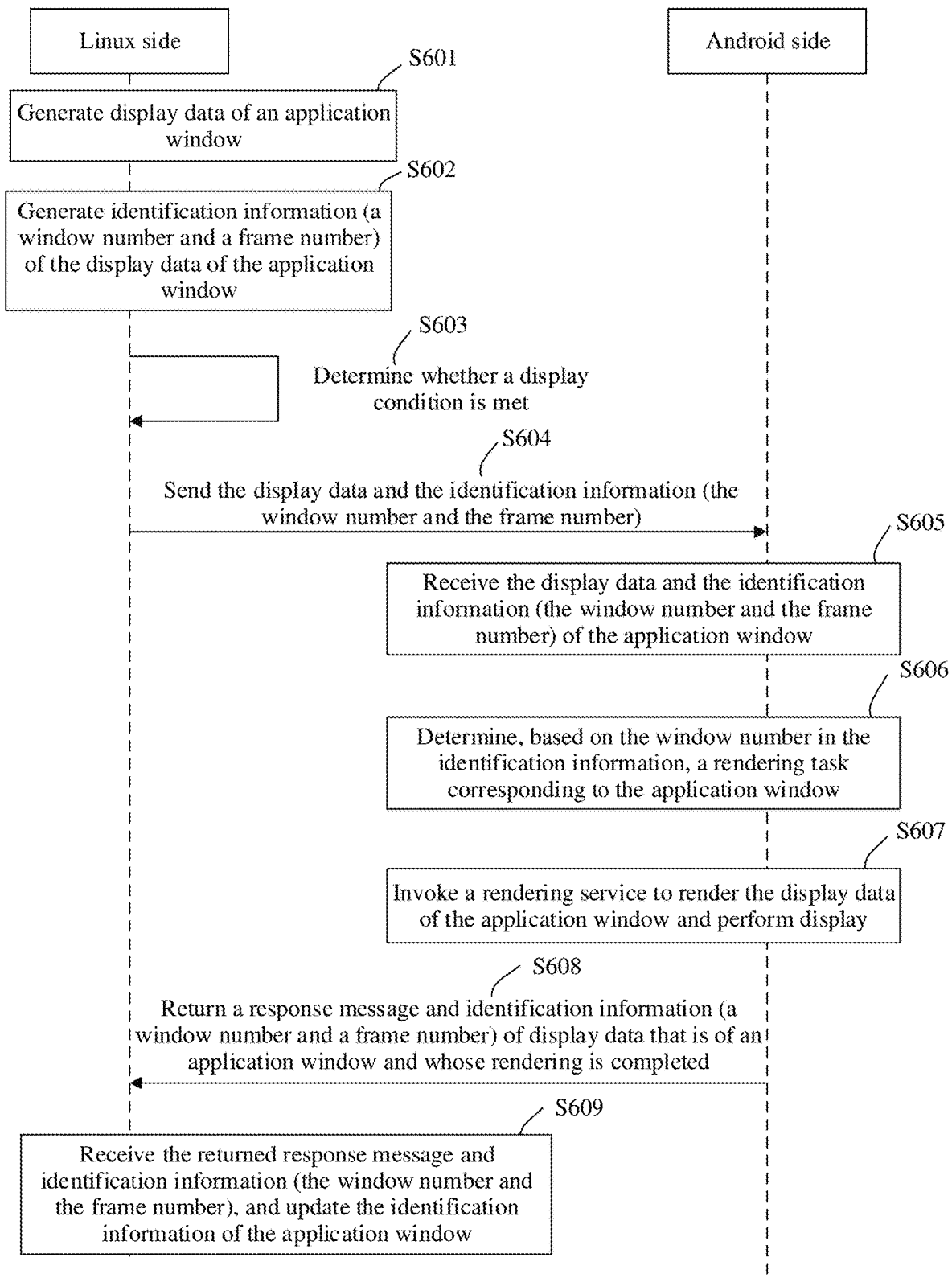
FIG. 6 is a schematic flowchart of an application display method of an electronic device according to an embodiment of this application.

Based on the software and hardware structures of the electronic device 100 shown in FIG. 5, the following describes in detail an application display method of the electronic device 100 in this application through FIG. 6.

Specifically, a related program is executed by the processor 110 of the electronic device 100, to implement the application display method in FIG. 6 in this application. As shown in FIG. 6, the application display method that is applied to the electronic device and that is provided in a specific implementation of this application includes the following steps.

S601: Generate display data of an application window.

In this embodiment of this application, the display data herein may be a text, an image, and various components (such as a button, an input box, and a drop-down box) in the application window on a Linux side of the electronic device 100.

S602: Generate identification information of the display data of the application window.

In this embodiment of this application, the identification information of the display data may be a window number (w_id) of the application window, a returned frame number (rsp_f_id), and a current frame number (current_f_id). The window number (w_id) uniquely identifies the application window on the Linux side. In other words, if windows of a plurality of applications are started on the Linux side of the electronic device 100, a window of each application has a unique window number (w_id). The current frame number (current_f_id) identifies display data of the window of each application that is currently generated on the Linux side, and the returned frame number (rsp_f_id) is used to store a frame number that is returned by an Android side to the Linux side and that is of display data of an application window whose rendering has been completed.

For example, an application 1 and an application 2 may be started on the Linux side, and the application 1 and the application 2 respectively correspond to a window 1 and a window 2. In this case, in addition to generating display data of the window 1 and the window 2, the Linux side may further generate a window number w_id1 of the window 1 and a window number w_id2 of the window 2. It may be understood that, if the Linux side generates the display data of the window 1 and the window 2 for the first time, in other words, if the Linux side generates display data of first image frames of the window 1 and the window 2, a current frame number of the window 1 and the window 2 may be current_f_id=1, and a returned frame number rsp_f_id is empty. The Linux side may uniquely identify the display data of the application window by using the window number in combination with the current frame number. w_id1+1 may identify the display data of the first image frame of the window 1, and w_id2+1 may identify the display data of the first image frame of the window 2.

It may be understood that an application started on the Linux side may alternatively have a plurality of windows. For example, the application 1 may be started on the Linux side, and the application 1 corresponds to the window 1 and the window 2.

S603: Determine whether a display condition is met.

In this embodiment of this application, if the display condition is met, step S604 is performed. If the display condition is not met, wait until the display condition is met.

The display condition herein may include: the display data of the application window on the Linux side changes, a primary system (Android system) of the electronic device 100 reaches a next display periodicity, and a rendering service on the Android side has completed rendering display data that is of an application window and that is sent last time.

It may be understood that the display data of the application window on the Linux side changes indicates that display content of the application window changes, in other words, display data that is of two adjacent image frames in a window and that is generated by the Linux side is inconsistent. That a primary system (Android system) of the electronic device 100 reaches a next display periodicity indicates that a process from sending, by the Linux side to the Android side, the display data of the application window to completing rendering and performing display by the Android side needs to be completed within a display periodicity.

It may be understood that a process of determining that the rendering service on the Android side has completed rendering the display data that is of the application window and that is sent last time may include: The Linux side receives a response message about rendering completion and identification information of the display data of the application window whose rendering has been completed. The Linux side determines, based on a window number in the identification information, an application window corresponding to the window number. The Linux side determines whether a difference between a frame number (f_id) of the application window in the identification information and a current frame number (current_f_id) that is of an application window and that is stored on the Linux side is 1. If the difference is 1, it indicates that the display data that is of the application window and whose rendering that has been completed by the rendering service on the Android side is contiguous with display data that is of an application window and that is to be sent by the Linux side to the Android side. If the difference is not 1, it indicates that a frame loss occurs in an application window displayed on the Android side, and the Android side may require the Linux side to resend lost display data of the application window. Alternatively, the Linux side may ignore the lost display data of the application window, and continue to send a next piece of generated display data of the application window.

S604: Send the display data and the identification information.

In this embodiment of this application, the Linux side may simultaneously send, to the Android side, the display data of the application window and the identification information corresponding to the display data. For example, the Linux side may send, to the Android display proxy on the Android side by using the Linux display service shown in FIG. 4, the display data of the application window and the identification information corresponding to the display data. It may be understood that if a plurality of applications are started on the Linux side, in other words, windows of the plurality of applications are opened, the Linux side may generate display data of the windows of the plurality of applications and identification information corresponding to the display data. The Linux side may simultaneously send, to the Android side, the display data of the windows of the plurality of applications and the identification information corresponding to the display data.

For example, the Linux side generates the display data and identification information of the window 1 of the application 1 and the window 2 of the application 2, which include the window number w_id1 and the window number w_id2, and the current frame number current_f_id=1 of the display data of the window 2 of the window 1.

It may be understood that, after the Linux side sends the display data and the identification information of the application window to the Android side, the Linux side may continue to generate a next group of display data of the application windows, and a value of the current frame number of the display data of the application window may be incremental.

For example, if the current frame number of the display data that is of the window 2 of the window 1 and that has been sent by the Linux side is current_f_id=1, after the Linux side generates a next group of display data of the window 2 of the window 1, the current frame number of the display data of the window 2 of the window 1 is current_f_id=2.

S605: Receive the display data and the identification information of the application window.

In this embodiment of this application, the Android display proxy on the Android side may also simultaneously receive, from the Linux side, the display data of the windows of a plurality of applications and the identification information corresponding to the display data. The Android side may store the received display data of the windows of the plurality of applications and the identification information corresponding to the display data in a storage region (memory) of the electronic device 100. It may be understood that the storage region used to store the display data of the windows of the plurality of applications and the identification information corresponding to the display data may be a shared memory that is obtained through division performed by the Android side and that is specially used to store the display data of the windows of the plurality of applications and the identification information corresponding to the display data.

For example, if the Android side receives the display data of the window 1 of the application 1 and the window 2 of the application 2 and the window numbers w_id1 and w_id2 of the window 1 and the window 2, the Android side may create rendering tasks corresponding to the window 1 of the application 1 and the window 2, and uniquely identify the created rendering tasks by using the window numbers w_id1 and w_id2. In addition, the Android side may store the current frame number current_f_id=1 corresponding to the display data of the window 1 and the window 2 as a frame number f_id=1.

S606: Determine, based on the window number in the identification information, the rendering task corresponding to the application window.

In this embodiment of this application, if the Android side receives, from the Linux side, the display data of the windows of the plurality of applications and the identification information corresponding to the display data, the Android side may create a rendering task (window processing thread) for the window of each application, and the rendering task corresponding to the window of each application may be uniquely identified by using the window number (w_id) of the window. It may be understood that, for example, when the Android side receives the window 1 of the application 1 and the window 2 of the application 2, the Android side may create, by using the window number w_id1, the rendering task corresponding to the window 1 of the application 1, and create, by using the window number w_id2, the rendering task corresponding to the window 2 of the application 2. The rendering task of the window of each application may invoke the rendering service on the Android side to render display data of the application window.

It may be understood that the Android side may alternatively receive a plurality of windows of an application on the Linux side. For example, if the Android side receives the window 1 and the window 2 of the application 1, the Android side may uniquely identify the rendering task of the window 1 of the application 1 by using the window number w_id1, and uniquely identify a rendering task of the window 2 of the application 1 by using the window number w_id2.

S607: Invoke the rendering service to render the display data of the application window and perform display.

In this embodiment of this application, after the Android side creates the corresponding rendering task for the received display data of the window of each application, the Android side may read the display data of the application window from the storage region, in other words, the shared memory, of the electronic device 100 described in step S605, and invoke the rendering service on the Android side by using the rendering task corresponding to the application window, to render the display data of the application window and perform display.

S608: Return the response message and the identification information of the display data that is of the application window and whose rendering is completed.

In this embodiment of this application, after the Android side invokes, by using the rendering task corresponding to the application window, the rendering service on the Android side to render the display data of the application window and perform display, the Android side may return, to the Linux side, the response message of the display data that is of the application window and whose rendering is completed. In addition, the Android side may further return, to the Linux side, the identification information of the application window whose rendering is completed. For example, if the Android side completes rendering the window 1 and the window 2, the Android side returns, to the Linux side, response messages of the window 1 and the window 2 whose rendering is completed, the window number w_id1 and the window number w_id2 of the window 1 and the window 2, and the frame number f_id=1 of the window 1 and the window 2.

It may be understood that display content of the window 1 and the window 2 herein is not necessarily displayed simultaneously, and the display content of each of the window 1 and the window 2 may be displayed synchronously or asynchronously. A display sequence of the display content of the window 1 and the window 2 is not limited in this embodiment.

S609: Receive the returned response message and identification information, and update the identification information of the application window.

In this embodiment of this application, the Linux side receives the returned response message and identification information from the Android side. The Linux side may update the stored identification information of the application window, and return to step S601 again. The Linux side generates the next group of display data of the application window. When the display condition is met, the Linux side sends the generated next group of display data of the application window to the Android side again.

For example, the Linux side determines the corresponding window 1 and window 2 based on the returned window number w_id1 and window number w_id2, and stores the frame number f_id=1 that is returned and that is of the window 1 and the window 2 as a returned frame number rsp_f_id=1. The Linux side may calculate that a difference between the returned frame number rsp_f_id=1 and the current frame number current_f_id=2 of the window 1 is 1, and the Linux side determines that the display data that is of the application window 1 and that is sent by the Linux side to the Android side is contiguous. It may be understood that the foregoing process may be performed in step S603, in other words, performed in the step of determining whether the display condition is met.

Figure 7:
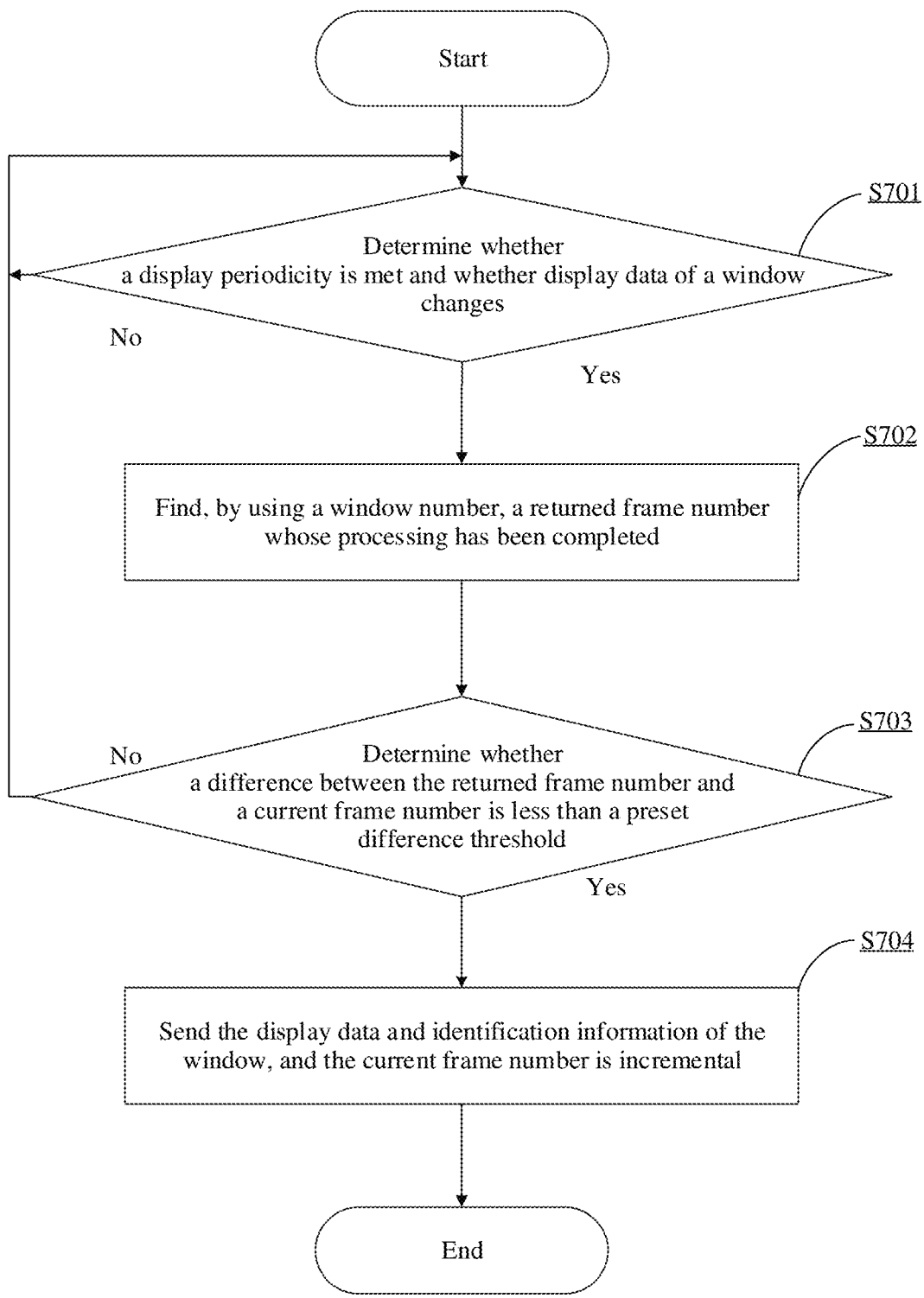
FIG. 7 is a schematic flowchart of sending, by a Linux side of an electronic device, display data of an application window to an Android side according to an embodiment of this application.
Figure 8:
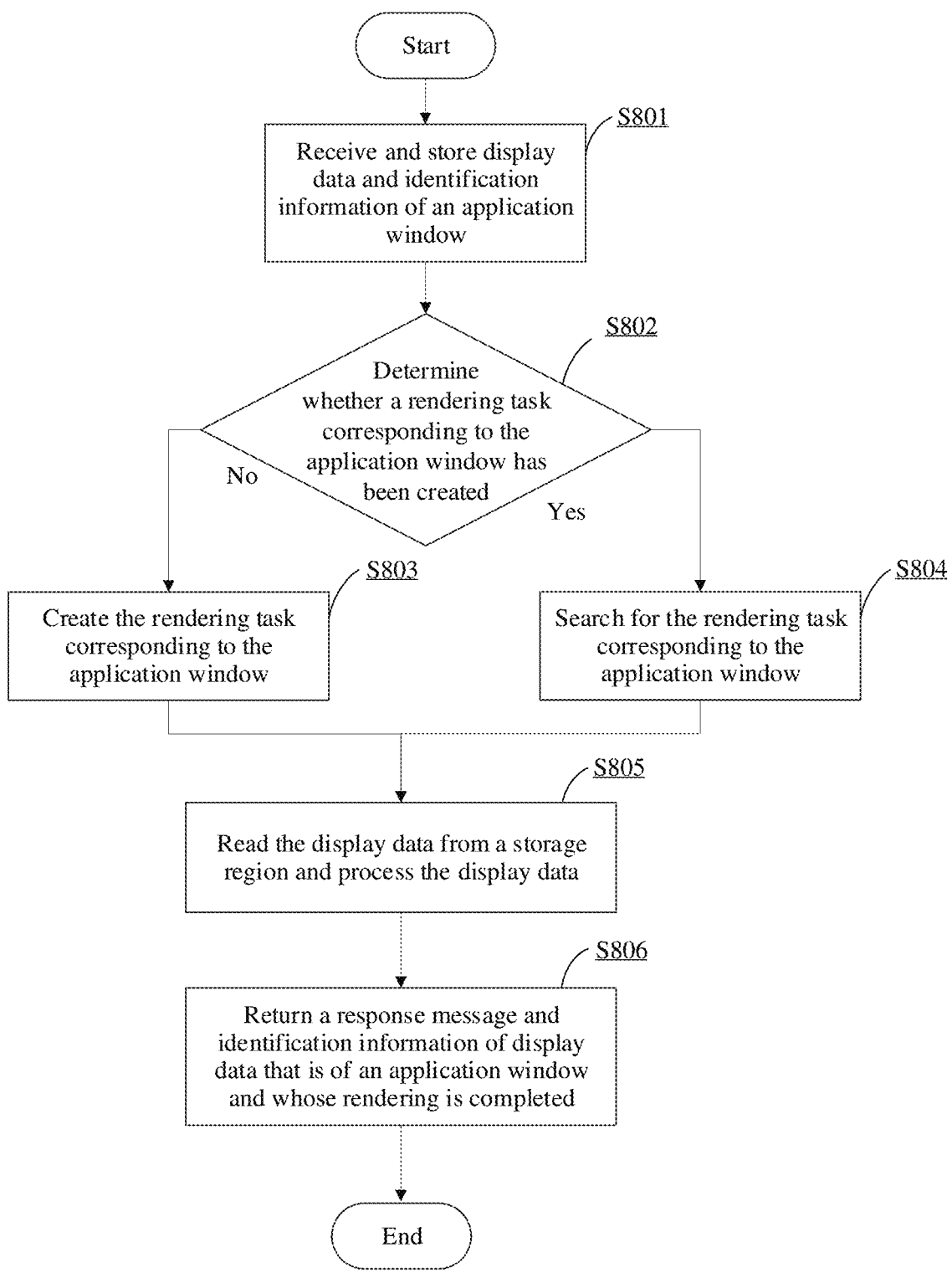
FIG. 8 is a schematic flowchart of receiving, by an Android side of an electronic device, display data of a window from a Linux side and rendering the display data of the window according to an embodiment of this application.
Figure 9:
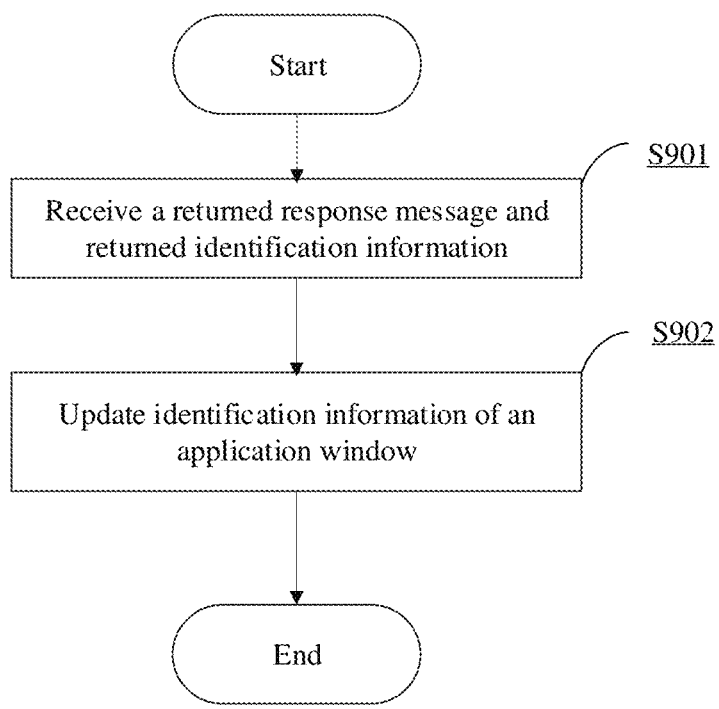
FIG. 9 is a schematic flowchart of receiving, by a Linux side of an electronic device, a response message from an Android side according to an embodiment of this application.

Refer to FIG. 7 to FIG. 9 in the following. FIG. 7 to FIG. 9 separately show steps in which a Linux side sends display data of an application window to an Android side, the Android side receives the display data of the window from the Linux side and renders the display data of the window, and the Linux side receives a response message from the Android side in an embodiment of this application. First, refer to FIG. 7. FIG. 7 shows a process in which a rendering service on a Linux side of an electronic device sends display data of an application window to an Android side according to an embodiment of this application. A solution in FIG. 7 may further describe step S202 to step S203 described in FIG. 2 or step S603 to step S604 described in FIG. 6. The process includes the following steps.

S701: Determine whether a display periodicity is met and whether the display data of the window changes.

If the condition is met and the display data of the window changes, step S702 is performed. If the condition is not met or the display data of the window does not change, step S701 is performed, and the Linux side continues to wait for the condition to be met.

S702: Find, by using a window number, a returned frame number whose processing has been completed.

In this embodiment of this application, in a process in which the Linux side continuously generates the display data of the application window and sends the display data, the Linux side also continuously receives the window number and the returned frame number that are of display data whose rendering is completed and that are returned by the Android side.

S703: Determine whether a difference between the returned frame number and a current frame number is less than a preset difference threshold.

The Linux side may determine a corresponding window based on the returned window number and calculate whether a difference between the returned frame number and the current frame number of the window is less than the preset difference threshold, to determine whether rendering of the sent display data of the window is completed. If the difference is less than the preset difference threshold, the Linux side may continue to send a next group of display data of the application window to the Android side. If the difference is not less than the preset difference threshold, the Linux side may return to step S701, and the Linux side continues to wait for the condition to be met. Alternatively, the Linux side may ignore lost display data of the application window, and continue to send a next piece of generated display data of the application window.

For example, the preset difference threshold herein may be set to 2, in other words, that the difference between the returned frame number and the current frame number of the window is 1 indicates that the display data that is to be sent by the Linux side is contiguous with the display data whose rendering is completed by the Android side, and no frame loss occurs. It may be understood that the preset difference threshold herein may be set to another value. For example, the preset difference threshold may be set to 3. In this case, a frame of display data is allowed to be lost between the display data that is to be sent by the Linux side and the display data whose rendering is completed by the Android side. A value range of the preset difference threshold is not limited in this embodiment of this application.

S704: Send the display data and the identification information of the window, and the current frame number is incremental.

The Linux side may continue to send the next group of display data of the application window to the Android side, and then generate the display data of the application window. In other words, a value of the current frame number of the display data that is of the application window and that is generated by the Linux side is gradually incremental.

After the process in which the Linux side sends the display data of the application window to the Android side is described through FIG. 7, refer to FIG. 8 in the following. FIG. 8 shows a process in which an Android side of an electronic device receives display data of a window from a Linux side and renders the display data of the window according to an embodiment of this application. A solution in FIG. 8 may further describe step S204 described in FIG. 2 or step S605 to step S607 described in FIG. 6. The process includes the following steps.

S801: Receive and store the display data and identification information of the application window.

The Android side may simultaneously receive, from the Linux side, display data of windows of a plurality of applications and identification information corresponding to the display data, and store, in a storage region (shared memory) of the electronic device 100, the display data of the windows of the applications and the identification information corresponding to the display data.

For example, the Android side receives display data of a window 1 of an application 1 and a window 2 of an application 2, and window numbers w_id1 and w_id2 of the window 1 and the window 2. In addition, the Android side may store a current frame number current_f_id=1 corresponding to the display data of the window 1 and the window 2 as a frame number f_id=1.

S802: Determine whether a rendering task corresponding to the application window has been created.

The Android side may search, by using a window number of the application window, whether the rendering task corresponding to the application window has been created. If the rendering task is not created, step S803 is performed. The Android side may create the rendering task corresponding to the application window, and uniquely identify the created rendering task by using the window number. If the rendering task has been created, step S804 is performed, and the Android side may search for the created rendering task by using the window number.

For example, the Android side may create or search for rendering tasks corresponding to the window 1 of the application 1 and the window 2 by using the window numbers w_id1 and w_id2.

S803: Create the rendering task corresponding to the application window.

The rendering task herein may be a processing thread of the display data of the window on the Android side. The rendering task may invoke a rendering service on the Android side, in other words, render the display data of the window by using a graphics processing unit (Graphics Processing Unit, GPU) of the electronic device. The Android side may create the rendering task corresponding to the application window, and uniquely identify the created rendering task by using the window number.

S804: Search for the rendering task corresponding to the application window.

The Android side may search for the created rendering task by using the window number.

S805: Read the display data from the storage region and process the display data.

The Android side may read the display data of the application window from the storage region, in other words, the shared memory, of the electronic device 100 described in step S801, and invoke the rendering service on the Android side by using the rendering task corresponding to the application window, to render the display data of the application window and perform display.

S806: Return a response message and identification information of display data that is of an application window and whose rendering is completed.

For example, if the Android side completes rendering the window 1 and the window 2, the Android side returns, to the Linux side, response messages of the window 1 and the window 2 whose rendering is completed, the window number w_id1 and the window number w_id2 of the window 1 and the window 2, and the frame number f_id=1 of the window 1 and the window 2.

After the process in which the Android side receives the display data of the window from the Linux side and renders the display data of the window is described through FIG. 8, refer to FIG. 9 in the following. FIG. 9 shows a process in which a Linux side of an electronic device receives a response message from an Android side according to an embodiment of this application. A solution in FIG. 9 may further describe step S205 described in FIG. 2 or step S608 to step S609 described in FIG. 6. The process includes the following steps.

S901: Receive a returned response message and returned identification information.

The Linux side may receive the returned response message from the Android side. In addition, the Linux side may further receive the identification information from the Android side. The identification information herein includes a window number of an application window whose rendering is completed by the Android side and a frame number of display data of the window.

For example, the Linux side receives a returned window number w_id1 and window number w_id2 and a frame number f_id=1 that is returned and that is of a window 1 and a window 2.

S902: Update identification information of the window application.

The Linux side may update the stored identification information of the application window, and generate a next group of display data of the application window. When a display condition is met, the Linux side sends the generated next group of display data of the application window to the Android side again.

For example, the Linux side stores the frame number f_id=1 that is returned and that is of the window 1 and the window 2 as a returned frame number rsp_f_id=1.

Figure 10:
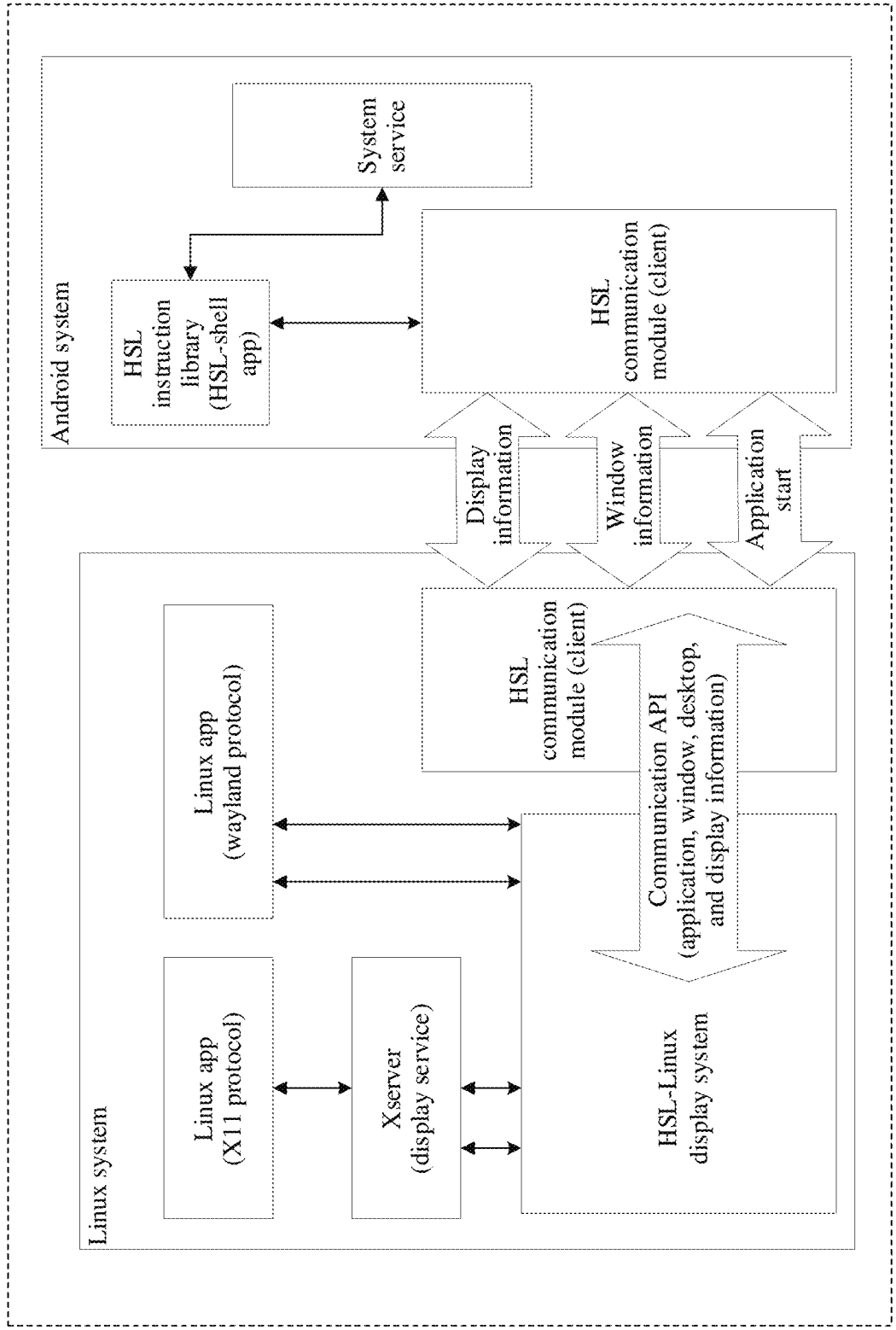
FIG. 10 is a diagram of a scenario in which an electronic device displays an application window according to an embodiment of this application.

It can be learned that FIG. 6 to FIG. 9 show the application display method applied to the electronic device 100 having the Linux and Android dual systems according to embodiments of this application. Refer to FIG. 10 in the following. FIG. 10 is a diagram of another scenario in which an electronic device displays an application window. Herein, a primary system of the electronic device 100 is an Android system. The electronic device 100 displays, on a screen of the electronic device, an application window that is of a Linux system and that is run on the Android system. In the scenario shown in FIG. 10, there are two types of graphics applications that may be displayed on a Linux side: an X11 protocol application and a wayland protocol application. The Linux system and an application of the Linux system are run in a virtual machine or a container in the Android system. The X11 protocol application interacts with an HSL-Linux display system by using XServer (display service). The wayland protocol application directly interacts with the HSL-Linux display system by using a wayland protocol. Window and display-related information is directly transmitted between the application and the HSL-Linux display system. After the information is processed by the HSL-Linux display system, display information of an application window and management information of the window are extracted and transmitted to an HSL-shell app (HSL instruction library) of the Android system through an HSL communication module and an HSL communication module client. Then, the HSL-shell app invokes a system service (rendering service) on an Android side to complete displaying a window of the Linux application on the Android system.

It should be understood that although terms such as "first" and "second" may be used in this specification to describe various features, these features should not be limited by these terms. These terms are merely used for distinction, and shall not be understood as an indication or implication of relative importance. For example, without departing from the scope of the example embodiments, a first feature may be referred to as a second feature, and similarly the second feature may be referred to as the first feature.

Furthermore, various operations will be described as a plurality of separate operations in a manner that is most conducive to understanding illustrative embodiments. However, a described sequence should not be construed as implying that these operations need to depend on the described sequence. A plurality of these operations may be performed in parallel, concurrently, or simultaneously. In addition, the sequence of the operations may be further rearranged. The processing may be terminated when the described operations are completed, but may also have additional operations not included in the figures. The processing may correspond to a method, a function, a procedure, a subroutine, a subprogram, or the like.

References to "an embodiment", "embodiments", "an illustrative embodiment", and the like in this specification indicate that the described embodiment may include a specific feature, structure, or property, but each embodiment may or may not necessarily include the specific feature, structure, or property. In addition, these phrases are not necessarily intended for a same embodiment. In addition, when specific features are described with reference to specific embodiments, knowledge of a person skilled in the art can affect combination of these features with other embodiments, regardless of whether these embodiments are explicitly described.

Unless otherwise stated, terms "contain", "have", and "include" are synonymous. A phrase "A/B" indicates "A or B". The phrase "A and/or B" indicates "(A), (B), or (A and B)".

As used in this specification, the term "module" may refer to being a part thereof, or include a memory (a shared memory, a dedicated memory, or a group memory) for running one or more software or firmware programs, an application-specific integrated circuit (ASIC), an electronic circuit and/or a processor (a shared processor, a dedicated processor, or a group processor), a combined logic circuit, and/or another proper component that provides the function.

In the accompanying drawings, some structure or method features may be shown in a specific arrangement and/or order. However, it should be understood that such a specific arrangement and/or order is not required. In some embodiments, these features may be described in a manner and/or order different from that shown in the descriptive accompanying drawings. In addition, structure or method features included in a specific accompanying drawing do not mean that all embodiments need to include such features. In some embodiments, these features may not be included, or these features may be combined with other features.

Embodiments of this application are described above in detail with reference to the accompanying drawings. However, use of the technical solutions of this application is not limited to various applications mentioned in embodiments of this application, and various structures and variations may be easily implemented with reference to the technical solutions of this application, to achieve various beneficial effects mentioned in this specification. Without departing from the purpose of this application, any variation made within the scope of knowledge possessed by a person of ordinary skill in the art shall fall within the scope of this application.

What is claimed is:

1. A method, applied to an electronic device, wherein a first system and a second system are run on the electronic device, and the method comprises:
receiving, by the second system from the first system, display data of a plurality of application windows and data identifiers of all the display data, wherein a first data identifier of first display data comprises a window identifier identifying an application window to which the first display data belongs;

sending, by the second system based on window identifiers corresponding to all the display data, all the display data to rendering tasks of the plurality of application windows corresponding to all the display data for respective rendering, to obtain rendered images of all the display data; and displaying, by the second system on a screen of the electronic device, the obtained rendered images of all the display data on the plurality of application windows corresponding to the display data.

2. The method according to claim 1, wherein the first data identifier further comprises a display data sequence number, and the display data sequence number indicates a rendering sequence of the first display data in a plurality of pieces of display data of a same application window.

3. The method according to claim 2, wherein the plurality of application windows comprises a first application window, and the first display data is display data of the first application window; and the method further comprises:

after completing rendering the first display data, returning, by the second system, a first response message and the first data identifier of the first display data to the first system;

selecting, by the first system, the display data of the first application window from the generated display data based on a first window identifier in the received first response message and the first data identifier, and selecting, from the selected display data of the first application window based on a first display data sequence number in the first data identifier, second display data to be rendered after the first display data; and sending, by the first system, the second display data and a second data identifier of the second display data to the second system, wherein the second data identifier comprises the first window identifier and a second display data sequence number.

4. The method according to claim 1, wherein the rendering tasks are thread tasks created by the second system, and each application window corresponds to one respective rendering task.

5. The method according to claim 3, wherein the plurality of application windows further comprise a second application window, and the display data of the plurality of application windows further comprises third display data of the second application window, and wherein a data amount of the first display data is different than a data amount of the third display data, and a time at which the second system renders the first display data is different from a time at which the second system renders the third display data.

6. The method according to claim 4, wherein the plurality of application windows further comprise a second application window, and the display data of the plurality of application windows further comprises third display data of the second application window, and wherein a data amount of the first display data is different than a data amount of the third display data, and a time at which the second system renders the first display data is different from a time at which the second system renders the third display data.

7. The method according to claim 5, wherein on the screen of the electronic device, a display frame rate of a rendered image of the first application window is different from a display frame rate of a rendered image of the second application window, and each display frame rate indicates a respective quantity of rendered images refreshed by the corresponding application window per unit time.

8. The method according to claim 1, wherein the first system comprises a Linux system, the second system comprises an Android system, the second system is a primary system running on the electronic device, and the first system is a secondary system running in the second system.

9. The method according to claim 1, wherein the plurality of application windows comprises windows of a same application in the first system.

10. The method according to claim 1, wherein the plurality of application windows comprises windows of different applications in the first system.

11. An electronic device, comprising:

at least one processor; and a non-transitory computer readable medium which contains computer-executable instructions;

wherein the at least one processor is configured to execute the computer-executable instructions, enabling the electronic device to run a first system and a second system, and perform operations comprising:

receiving, by the second system from the first system, display data of a plurality of application windows and data identifiers of all the display data, wherein a first data identifier of first display data comprises a window identifier identifying an application window to which the first display data belongs;

sending, by the second system based on window identifiers corresponding to all the display data, all the display data to rendering tasks of the plurality of application windows corresponding to all the display data for respective rendering, to obtain rendered images of all the display data; and displaying, by the second system on a screen of the electronic device, the obtained rendered images of all the display data on the plurality of application windows corresponding to all the display data.

12. The electronic device according to claim 11, wherein the first data identifier further comprises a display data sequence number, and the display data sequence number indicates a rendering sequence of the first display data in a plurality of pieces of display data of a same application window.

13. The electronic device according to claim 12, wherein the plurality of application windows comprise a first application window, and the first display data is display data of the first application window, and executing the computer-executable instructions further enables the electronic device to perform operations comprising:

after completing rendering the first display data, returning, by the second system, a first response message and the first data identifier of the first display data to the first system;

selecting, by the first system, the display data of the first application window from the generated display data based on a first window identifier in the received first response message and the first data identifier, and selecting, from the selected display data of the first application window based on a first display data sequence number in the first data identifier, second display data to be rendered after the first display data; and sending, by the first system, the second display data and a second data identifier of the second display data to the second system, wherein the second data identifier comprises the first window identifier and a second display data sequence number.

14. The electronic device according to claim 11, wherein the rendering tasks are thread tasks created by the second system, and each application window corresponds to one respective rendering task.

15. The electronic device according to claim 13, wherein the plurality of application windows further comprise a second application window, and the display data of the plurality of application windows further comprises third display data of the second application window, and wherein a data amount of the first display data is different then a data amount of the third display data, and a time at which the second system renders the first display data is different from a time at which the second system renders the third display data.

16. The electronic device according to claim 15, wherein on the screen of the electronic device, a display frame rate of a rendered image of the first application window is different from a display frame rate of a rendered image of the second application window, and each display frame rate indicates a respective quantity of rendered images refreshed by the corresponding application window per unit time.

17. The electronic device according to claim 11, wherein the first system comprises a Linux system, the second system comprises an Android system, the second system is a primary system running on the electronic device, and the first system is a secondary system running in the second system.

18. The electronic device according to claim 11, wherein the plurality of application windows comprise windows of a same application in the first system.

19. The electronic device according to claim 11, wherein the plurality of application windows comprise windows of different applications in the first system.

20. A non-transitory computer readable medium which contains computer-executable instructions, wherein the computer-executable instructions, when executed by at least one processor, enable an electronic device to run a first system and a second system, and perform operations comprising:

receiving, by the second system from the first system, display data of a plurality of application windows and data identifiers of all the display data, wherein a first data identifier of first display data comprises a window identifier identifying an application window to which the first display data belongs;

sending, by the second system based on window identifiers corresponding to all the display data, all the display data to rendering tasks of the plurality of application windows corresponding to all the display data for respective rendering, to obtain rendered images of all the display data; and displaying, by the second system on a screen of the electronic device, the obtained rendered images of all the display data on the plurality of application windows corresponding to all the display data.

* * * * *

UNITED STATES PATENT AND TRADEMARK OFFICE
CERTIFICATE OF CORRECTION

| | | |
|---|---|---|
| PATENT NO. | : 12,474,878 B2 | Page 1 of 1 |
| APPLICATION NO. | : 18/899986 | |
| DATED | : November 18, 2025 | |
| INVENTOR(S) | : Yu et al. | |

It is certified that error appears in the above-identified patent and that said Letters Patent is hereby corrected as shown below:

In the Claims

In Column 27, in Claim 15, Line 14, delete "then" and insert -- than --.

Signed and Sealed this
Thirteenth Day of January, 2026

John A. Squires
*Director of the United States Patent and Trademark Office*